July 9, 1957  M. A. MATHYS  2,798,460
HYDRAULIC TRANSMISSION FOR MACHINE TOOLS
Filed Aug. 29, 1955  8 Sheets-Sheet 1

Inventor
Max A. Mathys
By Carlson, Pitzner, Hubbard & Wolfe
Attorneys

July 9, 1957 M. A. MATHYS 2,798,460
HYDRAULIC TRANSMISSION FOR MACHINE TOOLS
Filed Aug. 29, 1955 8 Sheets-Sheet 5

Inventor
Max A. Mathys
by Carlson, Pitzner, Hubbard & Wolfe
Attorneys July 9, 1957 M. A. MATHYS 2,798,460
HYDRAULIC TRANSMISSION FOR MACHINE TOOLS
Filed Aug. 29, 1955 8 Sheets-Sheet 6

Inventor
Max A Mathys
By Carlson, Pitzner, Hubbard & Wolfe
Attorneys

United States Patent Office 2,798,460
Patented July 9, 1957

2,798,460

HYDRAULIC TRANSMISSION FOR MACHINE TOOLS

Max A. Mathys, Detroit, Mich., assignor to Ex-Cell-O Corporation, Detroit, Mich., a corporation of Michigan Application August 29, 1955, Serial No. 531,179

6 Claims. (Cl. 121—45)

The present invention relates to improvements in machine tools and more particularly relates to a new and improved hydraulic transmission for driving a translatory machine tool element, for example, a reciprocatory table on a machine tool.

One object of the invention is to provide an improved hydraulic transmission for controlling a machine tool of the above general character which affords smoother and more precise regulation of the movements of the reciprocatory machine element and which is characterized by its extreme simplicity and its flexibility with respect to the wide range of automatic cycling available.

Another object of the invention is to provide a transmission of the type set forth above which includes a pressure fluid distributing valve for controlling the direction and rate of movement of the reciprocatory element as an incident to the translatory position thereof.

A further object of the invention is to provide a transmission of the above type including improved control means for positioning the pressure fluid distributing valves.

Still another object of the invention is to provide a novel distributing valve for use in a transmission of the above type and having means thereon for positioning it with a snap action and for holding it in the desired position.

Still a further object is to provide a transmission distributing valve of the character set forth above and including means for decelerating the movement thereof when it is actuated to reverse the direction of translation of the machine tool element for preventing an abrupt change of direction of the element with the consequent jarring and harmful vibrations.

Other objects and advantages will become apparent as the following description proceeds taken in connection with the accompanying drawings, wherein.

While the invention is susceptible of various modifications and alternative constructions, a certain illustrative embodiment has been shown in the drawings and will be described below in detail. It should be understood, however, that there is no intention to limit the invention to the specific form disclosed but on the contrary the intention is to cover all modifications, alternative constructions and equivalents falling within the spirit and scope of the invention as expressed in the appended claims.

Figure 1:
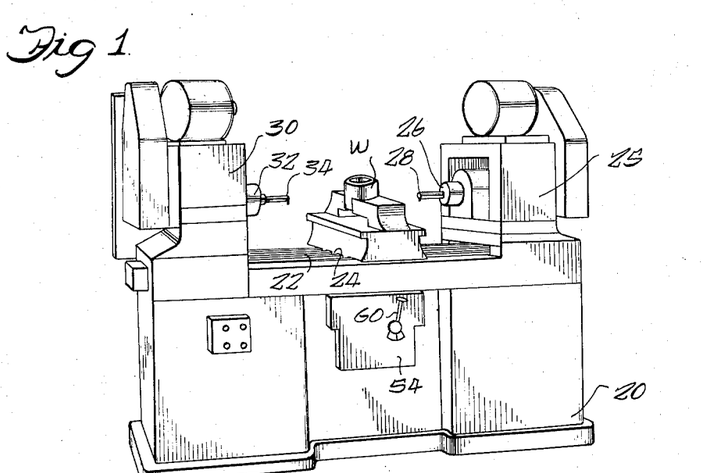
Figure 1 is a perspective view of a machine tool provided with a hydraulic transmission and controls embodying the features of the present invention.

The machine illustrated is a double-end precision boring machine comprising an elongated base 20 having a carriage or table 22 mounted thereon for reciprocation between two spindle supporting heads 25 and 30 mounted at opposite ends of the base. In the particular machine illustrated, the table 22 is adapted to support a workpiece W, suitable T slots 24 being provided for this purpose, while the heads 25 and 30 support rotatably driven spindles 26 and 32 respectively. The spindles are adapted to carry suitable cutting tools 28 and 34 at their inner ends so that the table 22, upon reciprocatory movement between the spindle heads brings the work into operative relation to the tools 28 and 34 alternately.

The above described machine is especially useful for accurately boring the wrist-pin holes of engine pistons, the ends of connecting rods, the hubs of single or clustered gears, and other objects requiring accurate drilling and boring operations. The tools 28 and 34 are accordingly shown as fly-cutter, or single point boring tools with cutters such as diamonds tungsten carbide.

For the machining operation, one or more workpieces may be mounted on the table 22. Thus, if separate workpieces are positioned in proper alignment with the spindles 26 and 32, one workpiece may be machined upon movement of the table 22 in one direction, i. e. to the left into operative relationship with the spindle 26 and the other workpiece may be machined upon movement of the table in the opposite direction. While one workpiece is being operated on, the other finished piece may be replaced by a new piece so that the operation of the machine is continuous. Alternatively, the fly-tools 28 and 34 may be adjusted to take relatively different depths of cut and the work may be mounted, as shown in Fig. 1, so that upon movement of the table 22 in one direction, one tool will take a roughing cut and upon movement of the table in the opposite direction, the other tool will take a finishing cut on the same workpiece. Either a single workpiece or a plurality of aligned workpieces may thus be operated on.

In order to translate the table 22 at any desired variations of speeds, for example at a rapid traverse when the tools are not taking a cut, at a slow feed during roughing cuts and at a still slower feed during finishing cuts, a hydraulic transmission embodying the present invention is provided. Provision is made in this transmission for automatically providing a uniform table movement at the selected speed and for changing from one speed to another without undue jarring or vibration of the machine.

Figure 2:
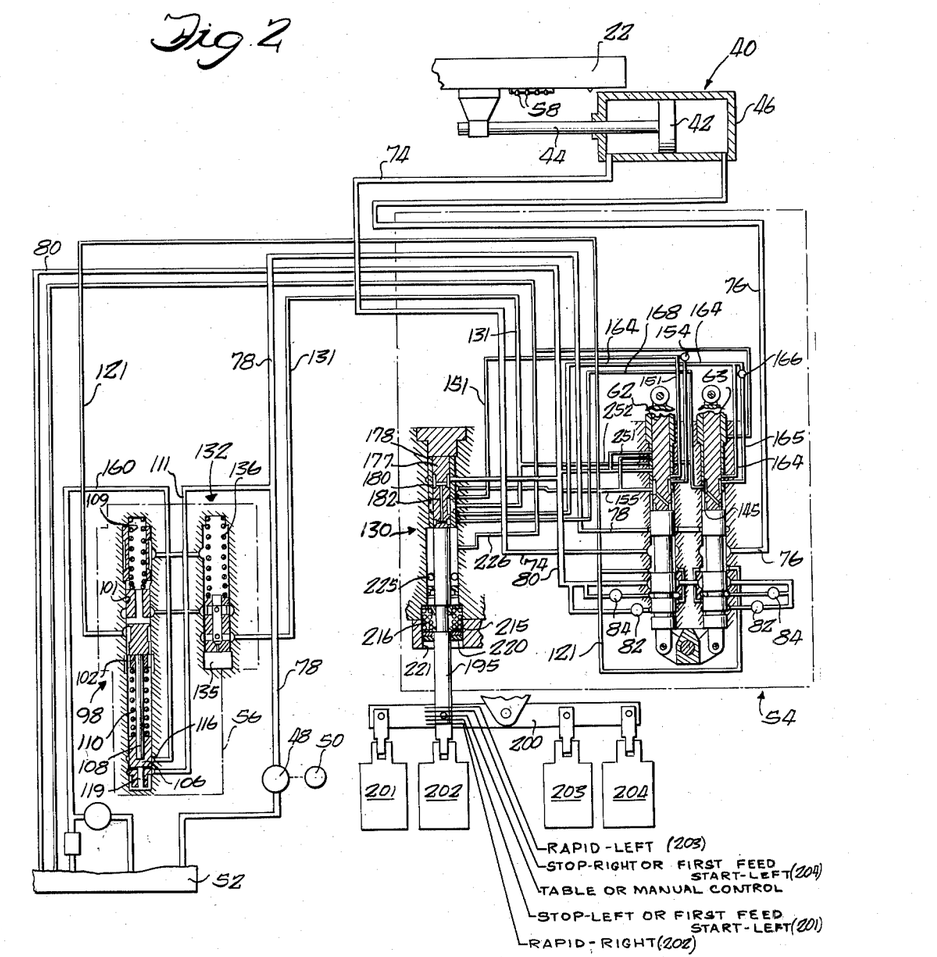
Fig. 2 is a diagrammatic representation of the hydraulic system used in the illustrative transmission and showing the parts in the automatic stop position.
Figure 3:
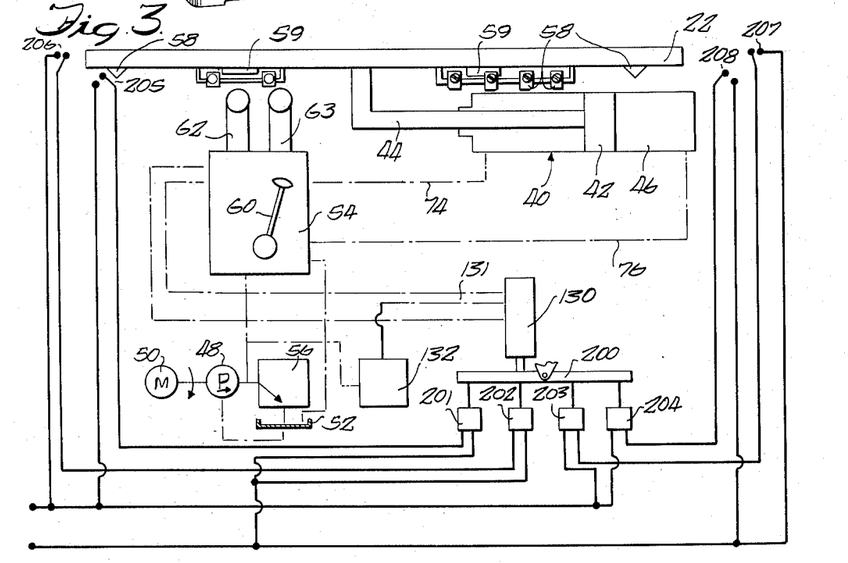
Fig. 3 is a diagrammatic representation of the electrical control circuit used with the illustrative transmission.

Referring now to Figs. 2 and 3, driving means for the machine table 22 is there shown in the form of a pressure fluid actuated motor 40 comprising a piston 42, the piston rod 44 of which is rigidly attached to the underside of the table 22, reciprocally mounted in a cylinder 46 so that the rod 44 extends from one end thereof. It can be seen that in order to move the table in any one desired direction, pressure fluid is supplied to the cylinder at one side of the piston 42 and exhausted from the cylinder at the other side of the piston. In this instance, pressure fluid is supplied by a pump 48 of any suitable character driven by an electric motor 50. Fluid is drawn from a sump 52 and delivered to the motor 40 through a control transmission, shown generally at 54, which determines the direction and speed of table movements as will appear presently.

The pump 48 may be of any of the standard type pumps used on such machines. For example, a variable pump wherein the outlet pressure may be varied over a given range; a two-pressure pump which provides pressure fluid at either high pressure and low volume or at high volume and low pressure; or a fixed delivery pump may be employed to provide a given volume of pressure fluid at a given pressure. The fixed delivery type pump is the one which is illustrated and described, although it should be apparent that the other types may be easily adapted for use with the novel transmission. Suitable pressure relief and control valves 56 are also provided in order to control the maximum pressure in the system to prevent damage to the machine in case of jamming and also to provide reduced pressure for operation of the various control elements.

The transmission 54 is provided with a number of control elements. In one instance, the transmission is automatically set as a function of the position of the table 22. For this purpose, control dogs 58 are provided on the undersurface of the table and are positioned therein so as to come into mechanical contact with valves or control switches forming a part of the transmission. These dogs 58 are adjustably positioned at any desired point along the table thereby presetting the machine so it will perform a given cycle of operation. Similarly, positioning stops 59 are also provided on the table undersurface to engage and position the valves. Further, a manual control lever 60 (Fig. 1) is provided for controlling manual operations on certain types of workpieces.

TRANSMISSION STRUCTURE

The direction and rate of travel of the table 22 is determined by a main distributing valve 61, forming a part of the transmission 54, and which is constructed so as to regulate the rate of flow from the exhaust side of the pressure fluid carriage motor 40. Referring more particularly to Figs. 2 and 4–10, it can be seen that this distributing valve 61 (Fig. 4) comprises a pair of valve spools 62 and 63 positioned in parallel chambers 64 and 65, respectively, in a housing 66. Each spool is pivotally connected at its lower end to a medially pivoted rocking lever 68 so that the spools move as a single unit. For example, as one spool is moved downwardly, the other spool moves upwardly a like amount. The upper ends of both of these spools extend out of the transmission housing 66 and in a position beneath the table 22 where they are in a convenient location for operative contact with the dogs 58 and positioning stops 59 on the undersurface thereof. Movement of the valve spools, upon contact by the dogs 58 is facilitated by the provision of rollers or similar cam surfaces 70 on their upper ends. The stops 59, on the other hand, engage the rollers 70 to prevent further valve movement.

Each of the pair of valve spools controls the flow of pressure fluid to and from one end of the cylinder 46 of the carriage motor 40. For purposes of description, one valve spool 62, illustratively shown on the left in Figs. 2 and 4, will be referred to as the master spool while the other valve spool 63, shown on the right in Figs. 2 and 4, will be referred to as the follower or slave spool. Each of these spools 62 and 63 is provided with a relatively long circumferential groove forming an annular space 72 and 73, respectively, when the spool is inserted in its respective chamber 64 and 65. The annular space 72 of the master spool communicates with one side of the motor piston 42 through a conduit 74 while the corresponding annular space 73 of the slave spool communicates with the opposite side of the motor piston 42 through a second conduit 76. Pressure fluid is supplied to each of these spools through a conduit 78 leading directly from the pressure fluid supply pump 48. This pressure fluid supply conduit 78 terminates in a port in each of the valve spool chambers 63 and 64 positioned slightly above the ports leading to the cylinder conduits 74 and 76. Just below these latter conduits is located the pressure fluid exhaust line 80, similarly terminating in ports in each of the spool chambers 64 and 65. Thus, as the master spool, for example, moves upwardly to establish communication between the pressure fluid supply line 78 and the cylinder line 74, the slave spool moves downwardly to establish communication between the pressure fluid exhaust line 80 and the line 76 from the opposite side of the motor cylinder 46.

Figure 4:
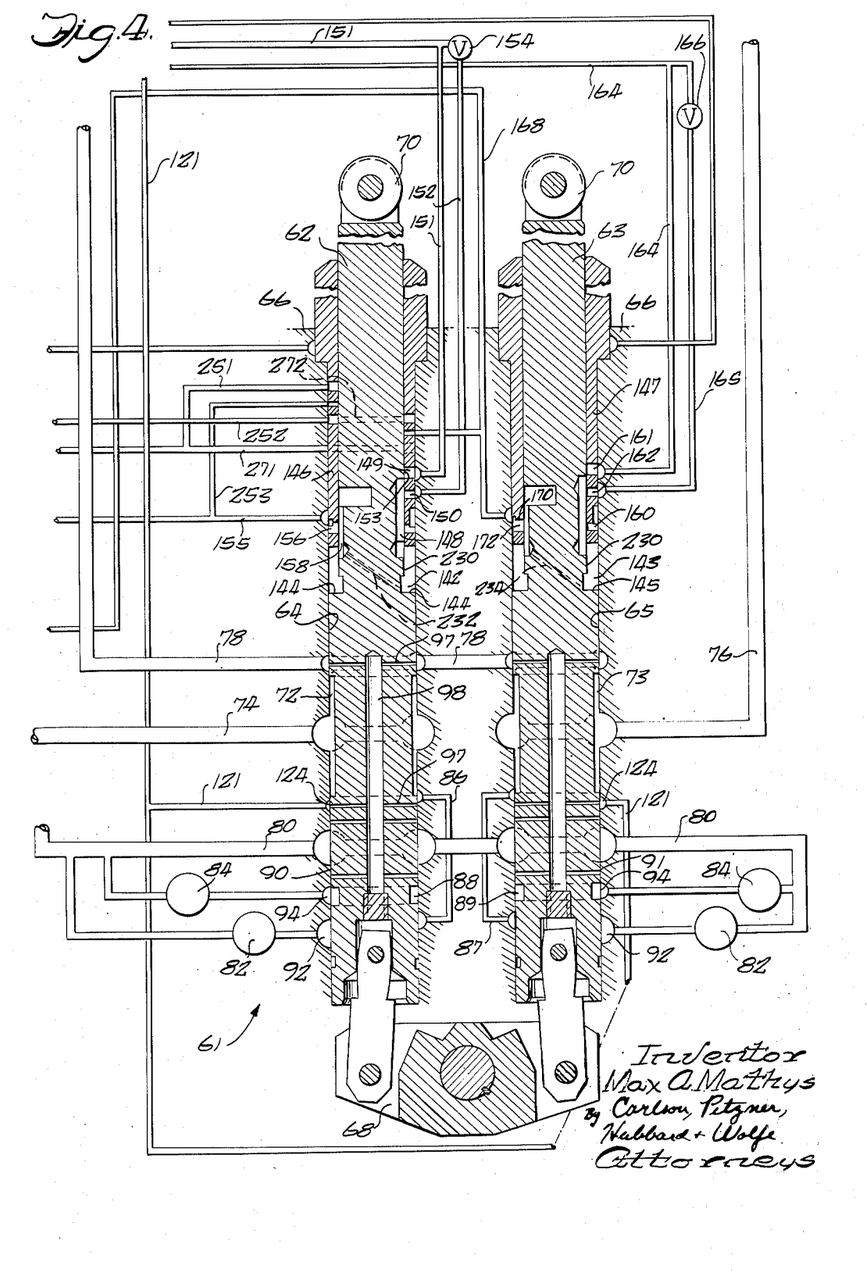
Fig. 4 is an enlarged sectional view of the transmission distributing valve in its related housing.
Figures 5, 6, 7, 8, 9, 10:
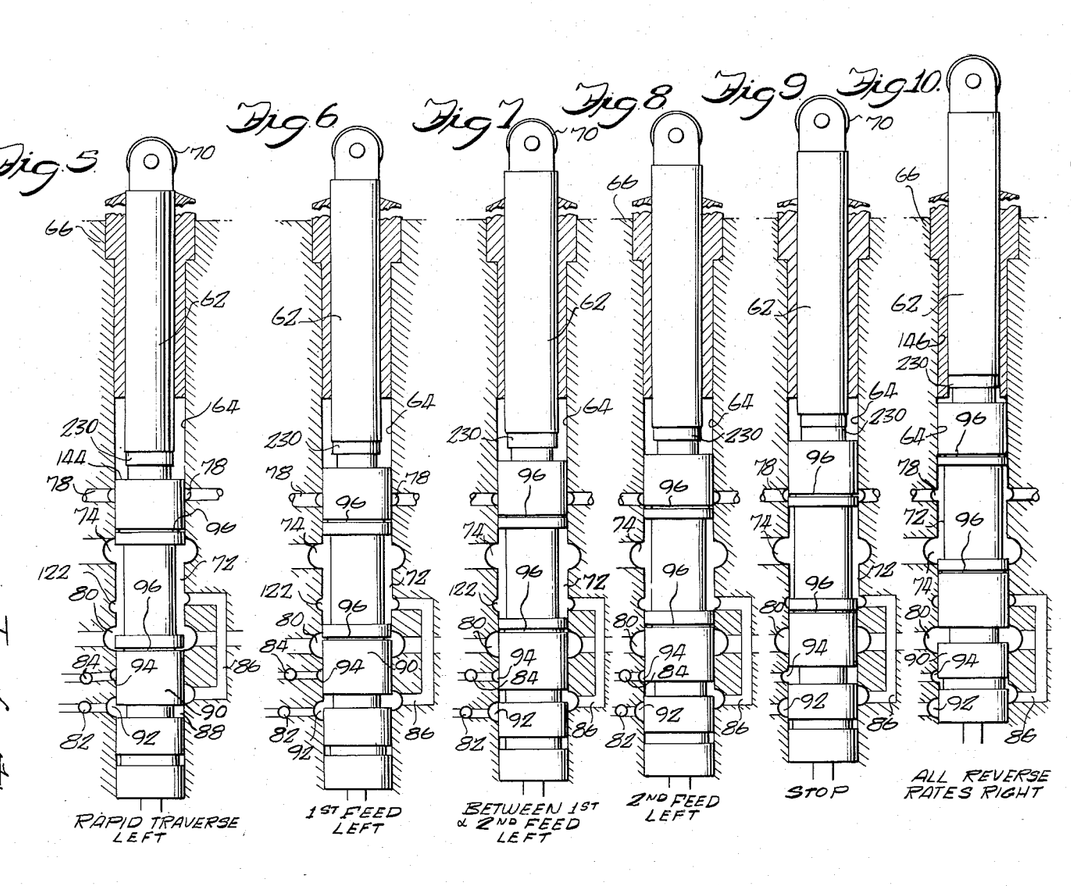
Figs. 5–10 are fragmentary sectional views of the transmission valve in its various positions.

The above described exhaust condition will occur only when the valves are in either of their extreme positions, which exist only when the master spool is either raised or lowered its full distance and the slave spool is correspondingly lowered or raised its full distance respectively. Considering for the moment the master spool 62 alone, Fig. 5 shows this spool in its lowermost position so that the cylinder conduit 74 leading thereto from one side of the motor cylinder 46 communicates directly with the main exhaust line 80. The slave spool will be, at the same time, in a position to connect the cylinder conduit 76 from the opposite side of the motor cylinder 46 directly in communication with the pressure fluid supply conduit 78 (Fig. 4). With the valve spools in these instant positions, full pump pressure will be exerted on one side of the motor piston 44 while the other side of this piston will be connected directly to exhaust, thereby moving the table at a rapid rate in the desired direction. It is desirable that the table, when in rapid traverse, move as fast as possible and therefore the full pump pressure is permitted to be exerted on the piston. It should further be understood that the direction of movement of the table will depend upon the relative positions of the master and slave spools, and that a reversal of such position will reverse the direction of table movement.

If a slower rate of travel of the table is desired, the mast spool is positioned, as shown in Figs. 6 or 8, to cause the fluid contained in the motor cylinder 46 in front of the piston 42 to be exhausted through a metering orifice. These orifices 82 and 84 shown in Fig. 2, which communicate with each of the valve spools 62 and 63 and are parallel with the main exhaust line 80, serve to reduce the rate at which the pressure fluid is exhausted from the motor cylinder, and thereby control the rate of table travel. This orifice metering of the pressure fluid is accomplished by providing, in the valve housing 66, a pair of channels or passages 86 and 87 leading from the portion of the chambers 64 and 65 respectively in the vicinity of the annular distributing spaces 72 and 73 to a point adjacent the lower end of each spool 62 and 63 wherein a second annular distributing groove 88 and 89 is provided. Depending on the number of metering orifices desired, for example two as embodied in the illustrative transmission and shown in Figs. 4–9, an equal number of corresponding axially aligned openings 92 and 94 are provided in both of the parallel valve chambers 64 and 65 communicating with the metering orifices 82 and 84. For some operations, it is desirable that the feed rates be different for the opposite directions of carriage movement, and separate orifice valves are provided for this purpose. It should be apparent, however, that only one pair of orifices can be used.

When the master valve spool is positioned as shown in Fig. 6, the main exhaust line 80 is closed by the land area 90 formed between the two distributing grooves 72 and 88 on the master spool 62, a similar area 91 being provided on the slave spool (Fig. 4). The exhausted fluid from the motor 40 is thus directed through the channel 86 in the housing 66 and into the lower annular groove 88 from which it passes through the lower passage 92 to the orifice 82. This orifice will be designated as the "first feed" orifice, and the valve position shown in Fig. 6 is therefore labeled "1st Feed." Upon further upward movement of the valve spool as shown in Figs. 7 and 8, the lower annular groove 88 communicates next with the upper orifice 84 through the upper passage 94 thereby giving a second feed rate to the carriage. Fig. 8 is therefore labeled "2nd Feed."

Further upward movement of the master spool 62 will close all of the exhaust passages 80, 92 and 94 and the carriage will come to rest in the stop position, shown in Fig. 9 and also in Figs. 2 and 4. Referring to Fig. 10, the valve spool is there shown in the pressure fluid supplying position and this is the location of the valve spool at all times above the stop position, the other valve spool being in the exhaust orifice metering position. This pressure fluid supplying position is therefore labeled in Fig. 10 as the "All Reverse Rates" as contrasted with the exhaust positions shown in Figs. 5–9.

Referring again to Figs. 2 and 4 wherein the valve spools are shown in the stop position, it can be seen that a downward movement of either one of the valve spools 62 and 63 will cause the other one to move upwardly, and it is by this movement that the rate of travel of the table is adjusted.

Figures 13, 14, 15, 25, 26:
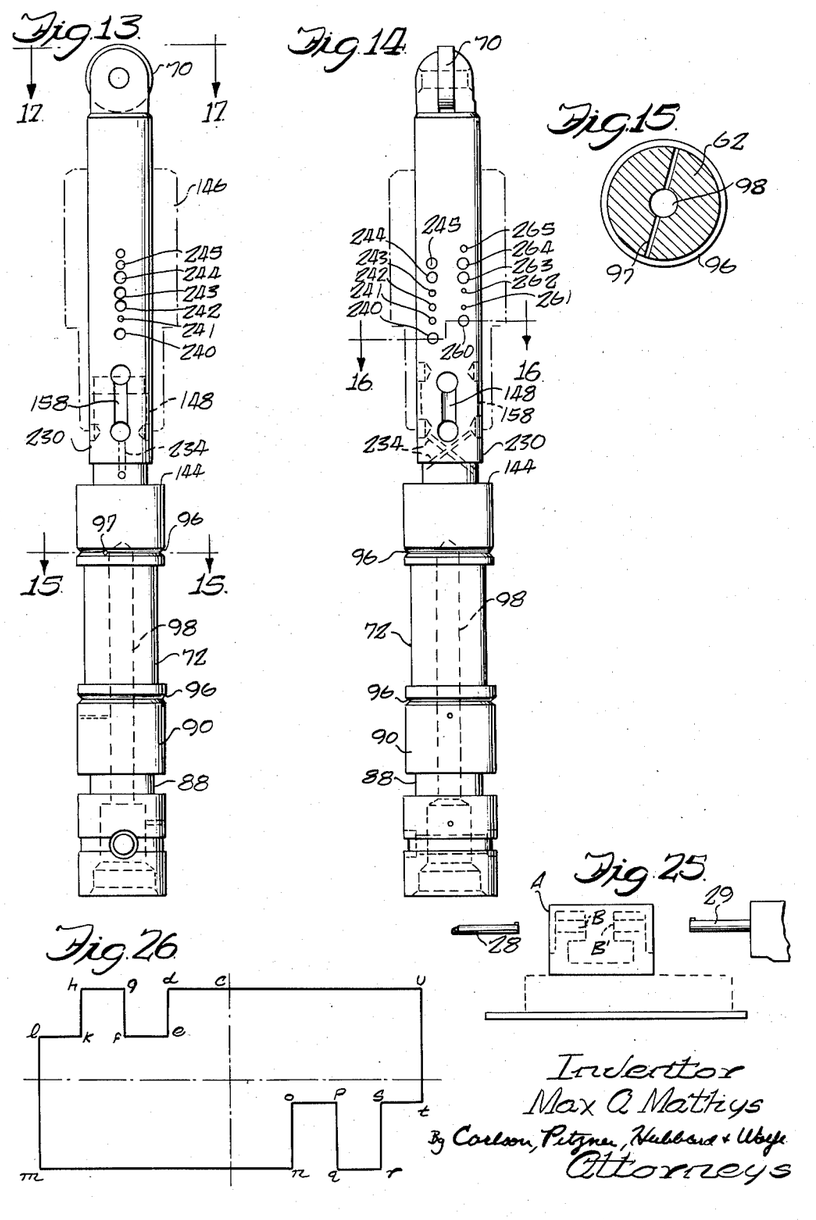
Fig. 13 is a front elevation view of the master distributing valve spool used in the illustrative transmission.
Fig. 14 is a side elevation view of the valve spool shown in Fig. 13.
Fig. 15 is a section taken substantially in the plane of line 15—15 of Fig. 13.
Fig. 25 is a diagrammatic representation of the relation between a workpiece and a boring tool.
Fig. 26 is a schematic diagram of an illustrative cycle of operations performed on the workpiece shown in Fig. 25.

An additional feature to insure uniform table travel is incorporated in the distributing valves 62 and 63 in the form of exhaust grooves 96 (Fig. 13). These grooves are constructed so as to prevent the pressure fluid which leaks around the distributing valve spools from entering into the meter-out lines of the carriage power cylinder 46 thereby excluding any extra pressure fluid from the control circuit. Each of these exhaust grooves are positioned on opposite axial sides of the main axial annular space of the valve spools and are connected to through ports 97 to an internal bore 98 (Fig. 4) leading to the main exhaust port 80. As fluid under pressure leaks from the blocked pressure ports towards the meter-out chambers it must first pass the exhaust grooves 96 and is conducted therethrough directly to the drain.

PRESSURE FLUID SUPPLY

It is desirable, in the operation of hydraulically powered machine tools, to maintain the feed of the cutting tool into the workpiece at a constant rate. Because the rate of travel of the motor piston 42 in the illustrative machine is directly proportional to the volume of fluid displaced from the motor cylinder 46, it is therefore important to maintain a constant rate of fluid flow through each of the exhaust orifices 82 and 84. This is accomplished by maintaining a constant pressure drop across the orifice which prevents a reduced rate of movement of the table during heavy cutting resistances or an increased rate of movement when the table is under light cutting resistances. In order to provide a constant feed rate when one of the exhaust orifices is being used, a pressure fluid control valve 98 (Fig. 11) which has the dual function of maintaining a constant pressure on the exhaust side of the motor cylinder 46 during the slow feeds and acting as a relief valve for the pump is employed in the main pressure fluid supply circuit.

Figure 11:
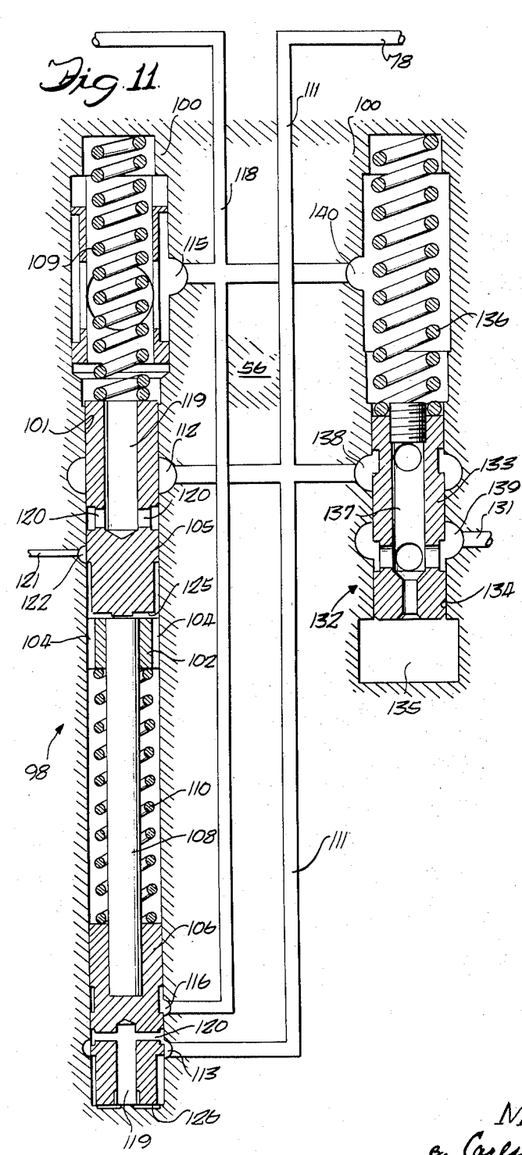
Fig. 11 is an enlarged sectional view of the pressure fluid relief and reducing valves.

One form of the pressure valve 98 is illustrated in Figs. 2 and 11 of the drawings and comprises a housing 100 having located therein a cylindrical valve chamber 101. This valve chamber is divided into upper and lower chambers by a medial inwardly projecting annular shoulder 102 in which a plurality of axially extending passages 104 are provided. For purposes of controlling the pressure of the exhaust fluid from the motor cylinder, a valve spool 105 is reciprocably mounted in the upper portion of the chamber 101. Similarly, a second valve spool 106 is reciprocably mounted in the lower portion of the chamber 101 which serves to limit the pressure delivered by the main pump.

Extending upwardly from the lower valve spool 106 and centrally through the annular shoulder 102 is a pin 108 adapted to engage the lower surface of the upper valve spool 105. Resistances are provided to the movement of the respective valve spools in the form of a compression spring 109 engaging the upper valve spool 105 to urge it against the pin 108 and second compression spring 110 engaging the lower valve spool to urge it against the lower end of the chamber 101. The spring constant of the upper spring is chosen to give the desired resistance and thereby the desired pressure in the motor cylinder exhaust line. As can be seen from the above construction, the resistance to the movement of the lower valve spool is the combination of the upper and lower springs and therefore the sum of the spring constants must be such as to give the desired maximum pump pressure.

The main pressure fluid supply line 78 from the pump communicates with the valve chamber 101 through passage 111 in the housing 100 terminating in upper and lower ports 112 and 113 adjacent the respective valve spools. Exhaust ports 115 and 116 are also provided in the chamber axially spaced from the pressure ports 112 and 113 respectively in the direction of valve movement and communicate with the pressure fluid sump 52 through a passage 118. In order to provide a valving action each of the spools is provided with an axial bore 119 opening at one end into the chamber and at the other end in a plurality of radial passages and ports 120.

In order to sense the exhaust pressure from the motor cylinder a conduit 121 is provided between a port 122 in the relief valve chamber adjacent the upper valve spool 105 and ports 124 in each of the main distributing valve chambers 64 and 65. When the exhaust pressure from the motor cylinder exceeds the amount determined by the spring constant of the upper spring 109, the upper valve spool is raised by the action of pressure fluid on the lower surface 125 thereof to discharge main pressure fluid line 78 into the sump 52 via the intermediate conduits 111 and 118 in the valve housing. This action reduces the force of the pressure fluid on the motor piston and thereby reduces the pressure of the exhaust fluid from the motor cylinder. When the condition has been alleviated, the upper valve spool in the relief valve 98 resumes its original position and pressure fluid is once again applied to the motor cylinder.

Pressure relief action for the pressure fluid supply line is provided when the pressure in the main supply line 78 exceeds the limit determined by the sum of the spring constants of the upper and lower springs 109 and 110 respectively. Under overpressure conditions, the lower valve spool is raised, by the action of fluid pressure on its lower surface 126, to a position where the radial passages 120 of the lower valve spool communicate with the exhaust line 118 allowing excess pressure fluid to flow therethrough from the main pressure line.

It can thus be seen that when the workpiece supporting table is under an increased resistance to movement caused by heavy cutting load conditions, the exhaust pressure will drop and the pump pressure will build up to the maximum amount to exert more force on the fluid motor 40. If, on the other hand, the resistance to movement of the carriage is decreased, the motor cylinder exhaust pressure increases only to a maximum amount as determined by the relief valve 98. At this point, the pressure fluid from the pump will be diverted directly to the exhaust, thereby reducing the force of the pressure fluid on the motor piston 42 and, as a result, reducing the motor cylinder exhaust pressure to the desired level.

TRANSMISSION CONTROLS

In general, means are provided for positioning the distributing valves of the transmission 54 in order to obtain any desired feed or direction of movement of the table. These means are adapted to be controlled either automatically according to the position of the table and rate at which it is traveling or manually by the machine operator. As described above, the transmission is placed on the front of the machine and just below the moving table 22 so that the dogs 58 projecting from the latter may engage the tops of the distributing valves 62 and 64. The dogs are also adapted to engage switches for operating the solenoids of a pilot valve in order to position the distributing valves automatically. Preferably the dogs are utilized for mechanically positioning the distributing valves only for unidirectional table traverse rate changes. Because reversal of the direction of table movement requires movement of the valves through the stop position, it is preferred to employ a solenoid operated pilot valve 130 for effecting such movement of the distributing valves.

The distributing valve spools 62 and 63 are adapted to be positioned according to the operation of the pilot valve 130 which distributes pilot pressure fluid thereto at a reduced pressure. This reduced pressure is supplied through a conduit 131 by a pressure reducing valve 132, which receives pressure fluid from the main pump and supply conduit 78. The pressure reducing valve 132, illustrated in Fig. 11, comprises a valve plunger 133 reciprocably mounted in a chamber 134 in the relief valve housing 100 and biased against the pressure in a chamber 135 at one end of the plunger chamber 134 by a spring 136 of a predetermined spring constant. A longitudinal bore 137 in the plunger opens into the pressure chamber 135, and into both a pressure fluid supply port 138, communicating with the supply conduit 117, and a reduced pressure fluid supply outlet port 139 leading to the pilot valve supply conduit 131. A port 140 in the spring chamber serves to conduct fluid leakage to the sump through the exhaust line 118. In the event the pressure acting on the end of the plunger in the chamber 135 balances the spring, the supply of fluid will be cut off. As a result, a low, constant pressure is maintained in the chamber 135 at all times.

Both the master distributing valve spool 62 and the slave distributing valve spool 63 are provided with a medial annular space 142 and 143 respectively, each space having formed adjacent thereto a reaction surface or shoulder 144 and 145 (Figs. 10 and 11). The portion of each distributing valve above the shoulder is of reduced diameter and reciprocates in a sleeve 146 and 147 respectively which is rigidly mounted in the valve housing 66. When pressure fluid is supplied from the pilot valve 130 to one of the distributing valves it will react on the above mentioned shoulder to force that valve downwardly.

Provision is made for controlling the amount of downward travel of either the master or the slave valve, depending upon which spool is subjected to pressure from the pilot valve, in the form of a plurality of pilot fluid inlet ports spaced axially from each other in the sleeves 146, and a plurality of axial grooves in each of the valve spool stems corresponding to these inlet ports. In order to position the master spool, for example, an axial groove 148 is provided thereon adjacent to pressure fluid inlet ports 149 and 150, the latter being connected to the pilot valve by conduits 151 and 152 respectively. When pressure fluid is supplied to these ports, it will enter the groove 148 and space 142 to exert a force on the shoulder 144 and move the valve spool downwardly. This movement ceases when the land area 153 at the end of the groove 148 covers the port openings 149 and 150 of the conduits 151 and 152. If less downward spool movement is desired, a plug valve 154 is provided in the conduit 152 which when closed, seals the lower port 150 so that when the land area 153 above the groove 148 closes the upper port 149, more fluid is prevented from entering the annular area above the reaction surface 144, and valve movement ceases. In this manner, the spool is moved downwardly a lesser distance than when the plug valve 154 is opened.

On the other hand, if it is desired that the valve spool be moved downwardly as far as it will go, a third pressure fluid conduit 155 from the pilot valve is arranged to communicate through a port 156 in the sleeve 146 with an axial groove 158 on the spool whereby pilot pressure is continuously applied to the reaction shoulder 144.

The slave spool is similarly constructed, by the provision of an axial groove 160 in the spool 63 communicating with axially aligned pressure fluid inlet ports 161 and 162 in the sleeve 147. These ports are connected with conduits 164 and 165 respectively from the pilot valve 130, a plug valve 166 being located in the conduit 165 leading to the lower sleeve port 162. This plug valve 166 serves the same purpose as the plug valve 154 in the corresponding master spool pilot conduit 152. In order to move the slave spool 63 downwardly as far as it will go, pressure fluid is supplied to the spool reaction surface 145 through a conduit 168 from the pilot valve 130 to a port 170 in the sleeve 147, communicating with an axial groove 172 in the spool 63.

It should be understood that when the pilot valve 130 is positioned to deliver pilot fluid to one of the valve spools, it is simultaneously positioned to exhaust pilot fluid from the other spool, thereby creating a force differential between the two reaction surfaces 144 and 145 which results in a relative movement of the valve spools. It is this relative movement which positions the valve spools in correlation with the respective pressure ports 78, exhaust ports 80, 92, 94 and motor cylinder conduits 74 and 76. For example, assume first that the master spool 62 is fully depressed and the slave spool 63 is fully raised. With this setting, the motor piston 42 and table 22 would be moving rapidly to the left because, referring to Fig. 2, the left hand cylinder conduit 74 communicates directly with the exhaust conduit 80, and full pump pressure is applied through the pressure conduit 78 and the righthand cylinder conduit 76 to the right side of the motor piston. Assume, second, that pilot fluid is now supplied to the reaction surface 145 of the slave spool 63 through the third mentioned pilot conduit 168 and sleeve port 170 to continuously exert a force on the reaction surface. Simultaneously, the fluid above reaction surface 144 of the master spool will be discharged as described above. This will cause a shift in the valve positions, the slave spool now being fully depressed, and, as a result, the carriage will traverse at a rapid rate in the opposite direction, i. e. to the right as shown in Fig. 2.

Figure 12:
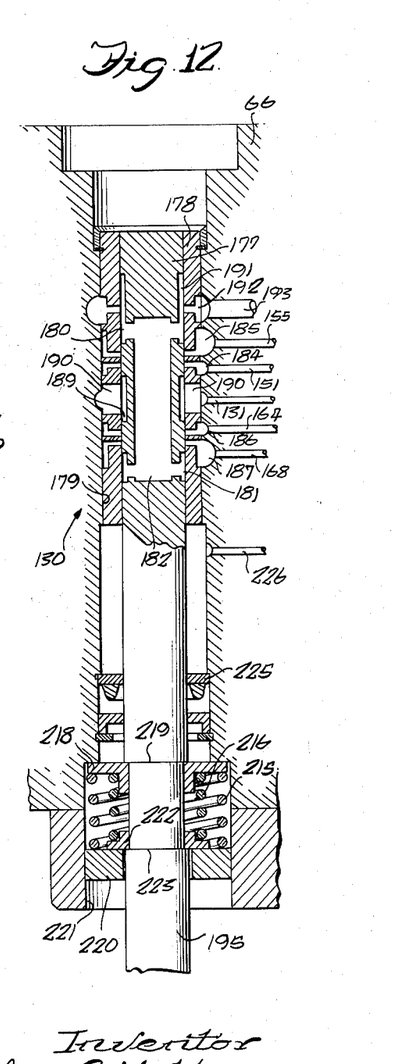
Fig. 12 is an enlarged fragmentary view, partly in section, of the pilot valve.

The pilot valve 130 provided in the illustrative transmission to distribute the reduced pressure fluid to the main valve spools 62 and 63, for positioning them in their respective chambers as described above, comprises a valve spool 177 reciprocably mounted in a sleeve 178, the latter being rigidly mounted in a chamber 179 formed in the main distributing valve housing 66 (Figs. 2 and 12). A pair of spaced apart annular slots 180 and 181 connected by an internal axial passage 182 are provided in the pilot spool for communicating with a plurality of axially aligned ports 184, 185, and 186, 187, respectively, in the sleeve, the ports in turn communicating with the pilot conduits 151, 155, 164, and 168, respectively, leading to the distributing valves. Intermediate the annular slots 180 and 181 in the pilot spool is a third annular slot 189 adapted to communicate with the reduced pressure fluid supply conduit 131 from the pressure reducing valve 132 through a port 190 in the pilot valve sleeve 178.

from entering the transmission housing, a suitable sealing member 225 is provided between the spool 177 and the chamber 179 along with a drain conduit 226 to discharge any leakage to the sump 52.

The following table (Table 1) illustrates the relationship between the distributing valve and pilot valve positions for each of the various feed rates provided in the transmission 54. This relationship has been set forth according to the communicating conduits required to give a particular feed rate and direction.

Table 1

| Table Traverse | Communicating Conduits ||||| Pilot Controls, Fig. 3 ||
|---|---|---|---|---|---|---|
| | Distributing Valves, Figs. 2 and 4 || Pilot Valve, Figs. 2 and 12 || | |
| | Motor Conduit 74– (Master Spool) | Motor Conduit 76– (Slave Spool) | Pressure Conduit 131– | Exhaust Conduit 193– | Solenoid Used | Plug Valves |
| To Right: | | | | | | 166 |
| Rapid | 78 | 80 | 168 | 155 | 202 | |
| 1st Feed | 78 | 82 | 164–165 | 155 | 201 | Open. |
| 2nd Feed | 78 | 84 | ¹ 164–165 | 155 | 201 | Open. |
| Stop | | | 164 | 155 | 201 | Closed. |
| To Left: | | | | | | 154 |
| Rapid | 80 | 78 | 155 | 168 | 203 | |
| 1st Feed | 82 | 78 | 151–152 | 168 | 204 | Open. |
| 2nd Feed | 84 | 78 | ¹ 151–152 | 168 | 204 | Open. |
| Stop | | | 151 | 168 | 204 | Closed. |

¹ Positioning blocks 59 on table 22 must be used to stop valve in 2nd feed.

The pilot valve also desirably serves to control the pilot fluid discharge from the space above the reaction surfaces 144 and 145. One of the spaced annular slots 180 in the pilot spool is therefore provided with an annular slot extension 191 which communicates with the main exhaust conduit 80 through a port 192 in the sleeve 178 leading to a branch conduit 193. It can therefore be seen that positioning of the pilot valve spool 177 in the sleeve 178 provides for selectively determinable communication between the pressure supply conduit 131 and the various pilot fluid supply conduits to one of the distributing valves while simultaneously providing for communication between the exhaust conduit 191 and the various conduits from the other distributing valve.

In order to selectively position the pilot valve spool 177 in the sleeve 178, the valve stem 195 is connected to a rocking lever 200 pivoted to the transmission frame. A plurality of solenoids 201—204 are provided having their armatures spaced along this lever to position the pilot valve according to signals received from corresponding switches 205—208 respectively (Fig. 3) which are mounted adjacent the moving table 22 for actuation thereby. By use of the rocking lever 200 the downward armature movement of each solenoid is multiplied as a function of the distance between the armature and the lever pivot point, so that even though each solenoid has the same armature travel, no two solenoids will position the pilot valve spool in the same place (Fig. 2).

Provision is made for centering the pilot valve spool 177 within the port sleeve 178 when the valve is vertically mounted in the transmission housing. This is accomplished by providing a spring 215 to compensate for the weight of the spool 177 and the stem 195, along with a concentric centering spring 216 to position the spool (Fig. 12). As the stem 195 is lowered by the action of a solenoid, an annular washer 218 is engaged by a shoulder 219 on the stem and compresses both springs, which are positioned against an annular stop 220 in the stem opening 221 of the housing. On the other hand, as the stem is raised, only the centering spring is compressed by a second annular washer 222 engaged by a shoulder 223 on the stem 195.

For purposes of preventing leakage from the pilot valve

To further explain the use of the above table in determining the settings required for a particular type of operation, assume, by way of example, that first-feed-left is desired. Referring to the table and to Figs. 2, 3, and 12: reading across the table at the line marked "To Left, 1st Feed," it can be seen that this feed results when the motor conduit 74 from the left hand side of the motor cylinder 44 communicates with the first orifice conduit 82. To obtain this position by means of the pilot valve, the pilot pressure conduit 131 communicates with the pilot conduits 151, 152 leading to the reaction surface 144 of the master spool 62; while the pilot exhaust conduit 193 is connected with the pilot space 143 of the slave spool 63. This positioning is accomplished electrically by closing a switch 208 to energize a solenoid 204 when the plug valve 154 is open. The final position of the master valve spool to give this particular feed rate and direction is shown in Fig. 6. With the above table, the hydraulic transmission circuit can be similarly traced for any of the other feed and direction rates.

In order to avoid subjecting the machine tool to undue shock or jarring when changing the feed rate on the translatory element or carriage 22 thereof, such as, for example, when the distributing valve spools are shifted from the stop position to the rapid traverse in either direction, or from any feed rate in one direction to rapid traverse in the opposite direction, a snubbing or decelerating action on the distributing valve spools is provided immediately prior to the opening and closing of the exhaust ports 80 by the lands 90 and 91 on the valve spools 62 and 63. As shown in Figs. 4–10, each of the spools is provided, adjacent its pilot reaction shoulders 144 and 145 respectively with a land area 230 which is slightly smaller in diameter than the inside of the sleeves 146 and 147. As this land area on either spool passes the rapid traverse port in the sleeves of that spool, the flow through that port is restricted, and the movement of the valve spool is thereby arrested. As can be seen upon examination of Fig. 4, this arresting or snubbing action occurs at the point where the main exhaust port 80 is being opened or closed, both valve spools being provided with the restricting land areas 230. The movement of the valve spool is thus sufficiently slowed to prevent such abrupt changes of table motion as described above. After sufficient fluid has leaked through between the land areas 230 and the sleeve, the valve spool continues to move, once again at a rapid rate since holes 232 and 234 are provided to reduce the restriction.

PRESSURE POSITIONING

In the illustrative distributing valve shown in Figs. 13 and 14 used in the subject transmission, provision is made for positioning each of the valve spools 62 and 63 with a snap action and to the exact desired position. This positioning means is used only when mechanical positioning of the valve spools is used since it would be over-ridden by the pilot valve control when one of the solenoids is actuated.

Figures 16, 17, 18, 19, 20:
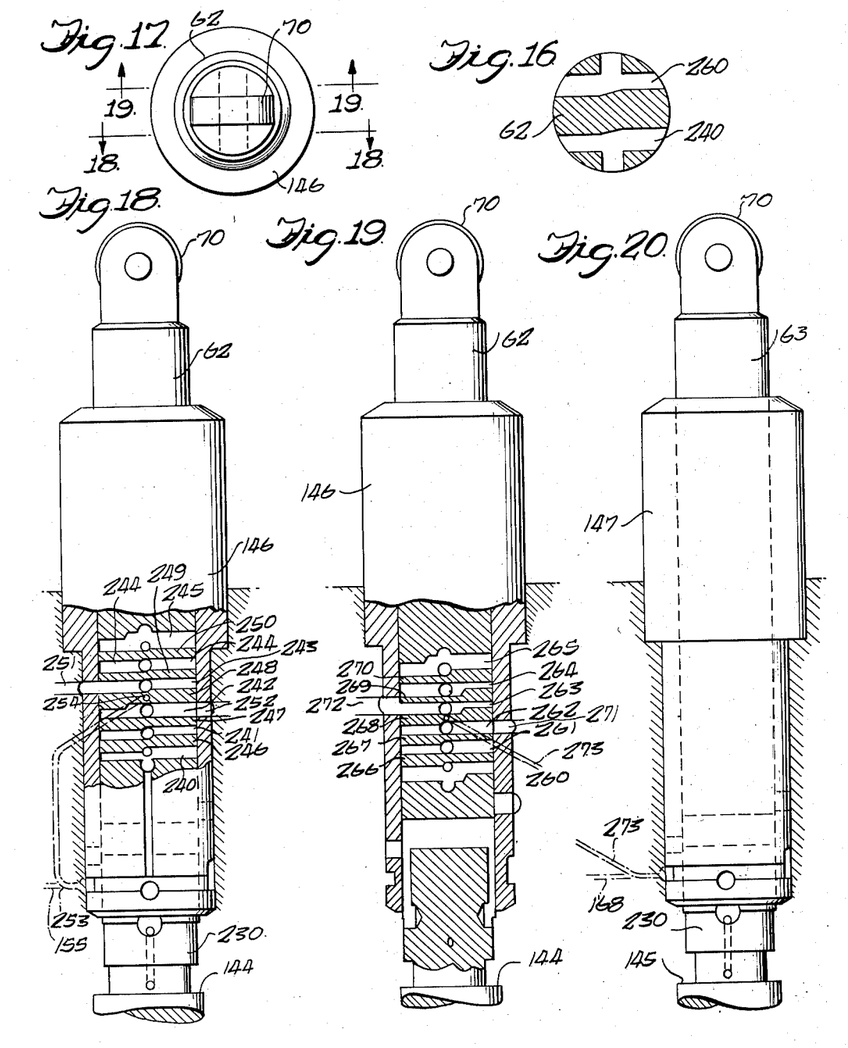
Fig. 16 is a section taken substantially in the plane of line 16—16 of Fig. 14.
Fig. 17 is a section taken substantially in the plane of line 17—17 of Fig. 13.
Figs. 18 and 19 are fragmentary views partly in section taken substantially in the plane of lines 18—18 and 19—19 respectively of Fig. 17.
Fig. 20 is a partial elevation view of the slave distributing valve spool and sleeve.

Referring to Figs. 2 and 4, it can be seen that there are seven different valve spool positions, that is, a stop position, three speed right positions and three speed left positions. Considering first the positioning operation for the master valve spool, and referring to Figs. 15–24, a plurality of T-shaped passages 240—245 are provided in the spool, numbered from the bottom upwards (Fig. 18) which are spaced so as to leave intermediate land areas 246—250. Each of the T-passages, the shape of which is shown generally in Fig. 16, terminates in three circumferentially spaced ports in the surface of the spool. A pressure fluid exhaust port 251 is provided in the sleeve 146 on one side of the spool while a pressure fluid inlet port 252 is provided in the sleeve on the opposite side of the spool (Figs. 2, 7, 18). Intermediate these pressure and exhaust ports is a conduit 253 terminating in a sleeve port 254 and leading to the pilot shoulder 144 so that the shoulder is subjected to either pressure or exhaust by means of one of the T-passages.

A similar series of T-passages 260—265 axially separated by lands 266—270 is provided on the master spool stem which are positioned so as to connect a pressure fluid exhaust conduit 271 or pressure conduit 272 to the pilot surface 145 of the slave valve spool 63 by means of a conduit 273 leading from a port 274 in the master spool sleeve 146. The positions of these latter described T-passages 260—265 are correlated with the position of the T-passages 240—245 so that, for example when one pilot surface is supplied with pressure fluid, the other pilot surface communicates with the exhaust.

When the valve spools 62 and 63 are in a particular feed position, the sleeve pilot ports 254—274 respectively are closed by one of the above mentioned lands. The particular land relating to a particular feed is shown in Table 2.

*Table 2*

| Table Traverse | Pressure Positioning—Land Areas for Spool Control | |
|---|---|---|
| | Master Port 254 | Slave Port 274 |
| To Right: | | |
| Rapid | [1] 240 | [1] 260 |
| 1st Feed | 246 | 266 |
| 2nd Feed | 247 | 267 |
| Stop | 248 | 268 |
| To Left: | | |
| Rapid | [1] 245 | [1] 265 |
| 1st Feed | 250 | 270 |
| 2nd Feed | 249 | 269 |
| Stop | 248 | 268 |

[1] Shown as enlarged port area.

The valves in the particular illustrated position shown in Figs. 18–20 of the drawings are positioned with the pressure fluid distributing sections thereof in the stop position as shown in Fig. 4. Reference should also be made to Table 2. Because no pressure fluid is being supplied to the motor cylinder mechanism 40, the table 22 is at a standstill. Referring first to the master spool 62 and its pilot controls, it should be noted that the pilot positioning conduit ports 254 and 274 are closed by lands 248 and 268 respectively on the master spool. Assuming for illustrative purposes that it is desirable that the valve remain in the stop position it can be seen that a slight shifting of the master valve downwardly, for example, will connect the master spool pilot conduit 253 to the exhaust to discharge fluid from the area above the pilot valve reaction surface 144. Simultaneously, pressure fluid is added through pilot conduits 273 and port 274 to the pilot valve reaction surface 145 of the slave spool. This will force the master spool upwardly to reposition the opening 254 of the pilot conduit 253 over the land 248, thereby centering both the master and slave spools in the stop position.

Figure 21:
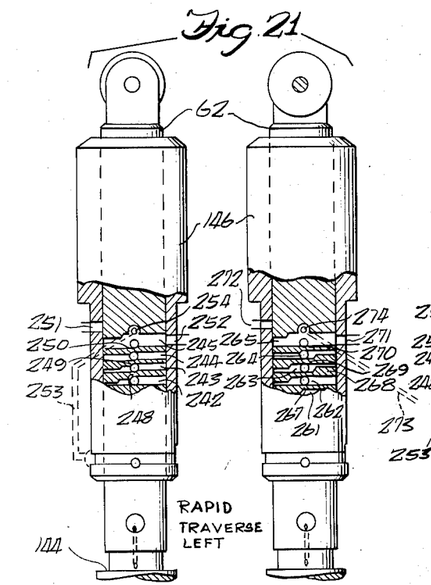
Figs. 21-24 are fragmentary views partly in section of the master valve spool and sleeve in four successive positions.
Figure 22:
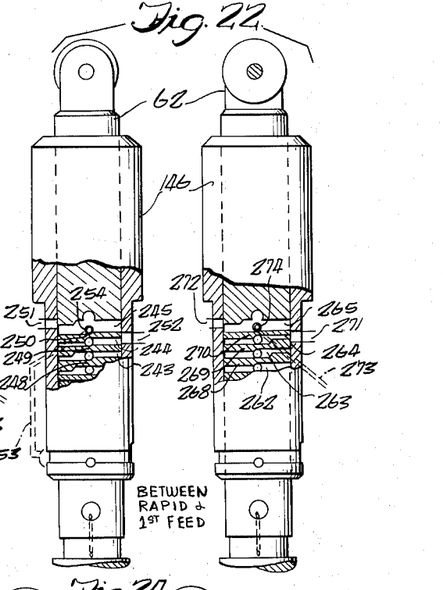

The same repositioning effect is obtained, if, for example, the master spool is forced by the manual handle 60 as far downwardly as it will go (Fig. 21). Instead, however, of the opening 254 of the pilot conduit being positioned on a land, it is positioned in constant communication through the T-passage 245, with the pressure line 252 in order to hold the master valve spool in its lowermost position. Simultaneously, the slave valve spool which is connected continuously with the exhaust conduit 271 by the T-passage 260 on the repositioning control of the master spool, will be held in its uppermost position.

Figures 23, 24:
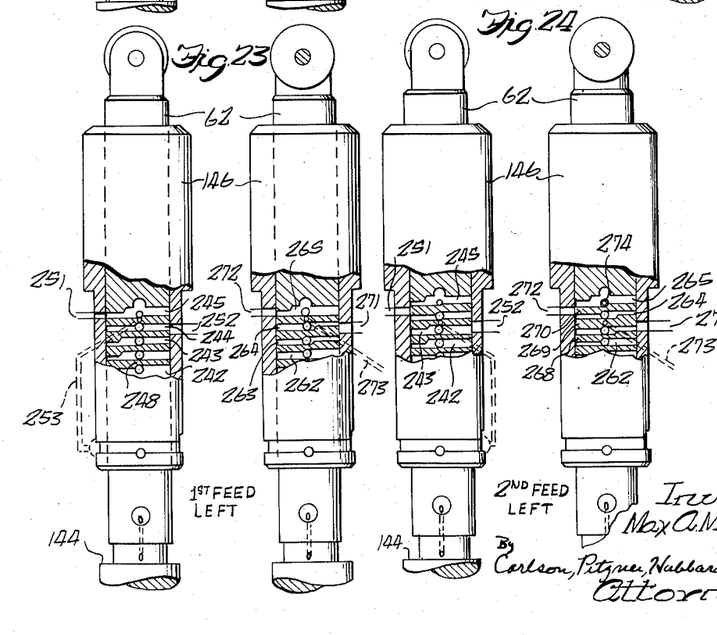

With the distributing valves in the extreme positions above described, the carriage will be shifted at rapid traverse toward the left as shown in Fig. 2. When a dog on the lower surface of the table 22 strikes the exposed extended portion of the slave valve spool 64 and that dog is set to shift the table onto one of the slower feed speeds, the dog must be of such depth as to correctly position the distributing portions of the valves with the proper exhaust outlets exposed. As the master valve spool 62 is forced upwardly by the action of the dog on the cam of the slave spool 63, its movement is resisted by the action of the pressure fluid, through the pressure supply passage 252 and the port 254 of the pilot line 253 on the reaction surface 144 of the master spool. This pressure must be overcome by the mechanical force of the dog in order to shift the slave spool downwardly and the master spool upwardly and position the port 254 of the pilot conduit to the master spool pilot surface 144 in communication with the pressure exhaust port 251. When this latter position is accomplished (Fig. 22) simultaneously with the positioning of the slave pilot conduit port 274 in communication with the pressure port 272, the valve spools are moved with a snap action to the next successive position, at which point the conduit openings 254 and 274 are positioned on the adjacent lands 250 and 270 respectively (Fig. 23). This particular position will give one particular feed rate to the carriage, the fluid being directed through the exhaust orifice conduit 84 (Fig. 5).

By a similar dog action, the master valve spool can be raised a further amount to the second feed left position, in which the pilot conduit openings 254 and 274 are positioned on the adjacent lands 249 and 269 respectively as shown in Fig. 24 and Table 2.

The pressure positioning can be accomplished in a number of ways, one form being shown in the drawings wherein the pressure positioning T-shaped passages for the master and valve spools respectively are diametrically opposed from one another, each occupying a segmental portion of the master valve spool. It should be understood, however, that similar series of T-shaped passages could be disposed axially of one another on the same relative surface.

OPERATION

In order that the work table 22 may be driven, for example, at a rapid traverse when neither of the tools is in operative contact with the work and at a slower feed when either tool is in cutting engagement with the work, suitable control dogs 58 are positioned on the under surface of the translatable table as described above and as further illustrated schematically in Fig. 3. In the initial stop position the distributing valve spools 62 and 63 extend upwardly from the transmission an equal amount. Similarly, the control switches are positioned adjacent the extended valve spools so as to be available for contact and operation by their particular control dogs. The switches and the valve spools are generally fixed relative to the transmission and the machine tool base. The dogs 58 and the positioning blocks 59 are movably mounted on the table and may be pivoted thereto so as to provide a depressing action only when the table is moving in one given direction, the pivoted dogs swinging out of the way when the direction of the table is reversed.

An illustrative cutting cycle is shown in Figs. 25 and 26, for a rough and finish boring operation on a workpiece "A" having two aligned holes B, B' therein as shown in Fig. 25. The table 22, on which the workpiece A is mounted, is moved, as illustrated graphically in Fig. 26 wherein the abscissas represent the extent of the carriage movement to the left and right of the neutral position and the ordinates indicate the speed of travel, to the left and right through the following cycle:

From the central starting position c the manual control handle 60 is moved to a position to initiate rapid traverse to the left, thereby moving the table 22 along the lines c—d until the tool 28 is about to contact with the leading hole B (Fig. 25) in the workpiece A. At the point d, a dog on the table depresses the right hand or slave valve spool 64, thereby raising the left hand or master valve spool 62 to the first feed position so that the table travels at this first feed along the line e—f while the leading hole B in the workpiece A is being rough bored. At the end of this boring step a dog depresses the master valve spool 62 and the tool crosses the space between the holes B, B' at rapid traverse along the line g—h. At point h, the slave valve spool 64 is again depressed for first feed and the second or trailing hole B' is rough bored at this speed along the line k—l. At the point l, a dog on the carriage closes the switch 206 thereby actuating the pilot valve 134 to reverse the distributing valves and move the table 22 at a rapid traverse to the right, along the line m—n until the tool 28 is about ready to contact with the then leading hole B'. By similar dog actions, the table moves at slow feed along o—p while the then leading hole B' is being finish bored; at a rapid traverse along q—r while the tool 28 is crossing the space between the holes B', B; at a slow feed along s—t while the trailing hole B is being finish bored. At the end of this traverse, a second switch 207 is then actuated to again activate the pilot valve 134 to reverse the positions of the distributing valves and thereby reverse the direction movement of the table to move it in rapid traverse towards the left along u—c to the initial starting position where a third switch 205 is closed to activate solenoid 201 and stop the carriage in the center position. The workpiece A is then replaced with another workpiece of like shape and the operation is repeated. While the carriage movements have been described as applied to a particular type of workpiece it should be understood that the programming of the carriage 22 may be varied to suit any desired problem without departing from the spirit and scope of the present invention.

Movement of the table 22 as to direction and speed is thus seen to be under the control of a selective dog actuated reset pilot and positioning mechanism which is accurate, efficient and reliable in operation and which is simple and compact in construction. The speed of travel of the workpiece supporting table 22 being controlled as a function of the rate of flow of the table motor discharge fluid through predetermined orifices, a smooth and uniform operation is obtained. This orifice control, known as discharge metering affords an improved means for varying the rate of feed in either direction to suit the depth of cut to be taken. The above described system is highly flexible and adaptable for continuous automatic control and is particularly suitable for use where accurate machining is required.

I claim as my invention.

1. For use with a double end boring machine including a base having a workpiece supporting table movably mounted thereon for translation between opposed tool carrying rotary spindles, a reversible pressure fluid motor for reciprocating the table, and a pressure fluid supply source, a transmission for connecting the pressure fluid supply to the motor, said transmission comprising in combination, a housing, a pressure fluid supply conduit between said housing and said source, a plurality of pressure fluid discharge metering conduits from said housing, a pressure fluid distributing valve reciprocably mounted in said housing, means on said valve for supplying pressure fluid to the motor, means on said valve for discharging pressure fluid from the motor selectively through said metering conduits, means on said table for engaging said valve for selectively positioning the same in communication with a preselected metering conduit, and pressure positioning means for yieldably holding said valve in communication with said preselected metering conduit.

2. A control transmission for use with a machine tool including a reversible piston and cylinder motor unit for reciprocating a movable machine tool element, a pair of fluid passages leading respectively to opposite ends of the motor cylinder, a source of pressure fluid, and a fluid discharge sump, said transmission comprising in combination a distributing valve having first and second valve members respectively connected for communication with respective fluid passages leading to the opposite ends of the motor cylinder, a pressure fluid supply conduit communicating with each valve member, a pair of exhaust metering conduits leading from said valve members to the sump, at least one of said valve members having an end extending in proximate relationship with the movable element, means for positioning said first valve member to connect its respective motor cylinder end to one of the exhaust conduits when the second valve member is positioned to supply pressure fluid to the other end of the motor cylinder, means on the movable element for operatively engaging said extending valve end for positioning said first valve member to connect its respective motor cylinder with the second exhaust conduit, a pilot valve for reversing the relative positions of said valve members, and means operatively engageable with said element for operating said pilot valve to effect said reversing action.

3. A control transmission for use with a machine tool including a reversible piston and cylinder motor unit for reciprocating a movable machine tool element, a pair of fluid passages leading respectively to opposite ends of the motor cylinder, a source of pressure fluid, and a fluid discharge sump, said transmission comprising, in combination, a distributing valve having first and second valve members respectively connected for communication with the respective fluid passages leading to the opposite ends of the motor cylinder, a pressure fluid supply conduit communicating with each valve member, a pair of exhaust metering conduits leading from said valve members to the sump, at least one of said valve members having an end extending in proximate relationship with the element, means for positioning said first valve member to connect its respective motor cylinder end to one of the exhaust conduits when the second valve member is positioned to supply pressure fluid to the other end of the motor cylinder, mechanical means on the movable element for operatively engaging said extending valve end for roughly positioning said first valve member to connect its respective motor cylinder with a different exhaust conduit, and pressure fluid pilot positioning means on one of said valve members for accurately positioning said first valve in its preselected discharge position and for holding said valve against accidental movement therefrom.

4. A control transmission for use with a machine tool including a reversible piston and cylinder motor unit for reciprocating a movable machine tool element, a pair of fluid passages leading respectively to opposite ends of the motor cylinder, a source of pressure fluid, and a fluid discharge sump, said transmission comprising, in combination, a distributing valve having first and second valve members respectively connected for communication with the respective fluid passages leading to the opposite ends of the motor cylinder, a pressure fluid supply conduit communicating with each valve member, a pair of exhaust metering conduits leading from said valve members to the sump, at least one of said valve members having an end extending in proximate relationship with the element, means for positioning said first valve member to connect its respective motor cylinder end to one of the exhaust conduits when the second valve member is positioned to supply pressure fluid to the other end of the motor cylinder, means on the movable element for operatively engaging said extending valve end for positioning said first valve member to connect its respective motor cylinder with a different exhaust conduit, a pilot valve for reversing the relative position of said valve members and a pair of sleeves interposed respectively between one end of each valve member and the housing, a shoulder on each valve member adjacent the inner end of the corresponding sleeve for providing a pilot fluid chamber, a conduit between said pilot valve and a port in each of said sleeves communicating with said chambers for alternately supplying pilot pressure fluid to one of said chambers and discharging fluid from the other, means in said chambers for restricting the opening of said ports during a portion of the valve reversing movement to decelerate the same, and means operatively engageable with said movable element for operating said pilot valve to effect said reversing action.

5. For use with a double end boring machine including a base having a workpiece supporting table movably mounted thereon for translation between opposed tool carrying rotary spindles, a reversible pressure fluid motor for reciprocating the table, and a pressure fluid supply source, a transmission for connecting the pressure fluid supply to the motor, said transmission comprising, in combination, a housing, a pressure fluid supply conduit between said housing and said source, a plurality of pressure fluid discharge metering conduits from said housing, a pressure fluid distributing valve reciprocably mounted in said housing, means on said valve for supplying pressure fluid to the motor, means on said valve for discharging pressure fluid from the motor selectively through said metering conduits, said valve having a pair of opposed pilot reaction surfaces thereon, pilot means for directing pressure fluid selectively to said surfaces for positioning said distributing valve in said housing and in communication with a preselected metering conduit, and pressure positioning means for yieldably holding said valve in communication with said preselected metering conduit.

6. For use with a double end boring machine including a base having a workpiece supporting table movably mounted thereon for translation between opposed tool carrying rotary spindles, a reversible pressure fluid motor for reciprocating the table, and a pressure fluid supply source, a transmission for connecting the pressure fluid supply to the motor, said transmission comprising, in combination, a housing, a pressure fluid supply conduit between said housing and said source, a plurality of pressure fluid discharge metering conduits from said housing, a pressure fluid distributing valve reciprocably mounted in said housing, means on said valve for supplying pressure fluid to the motor, means on said valve for discharging pressure fluid from the motor selectively through said metering conduits, said valve having a pair of opposed pilot reaction surfaces thereon, means on said table for engaging said valve for selectively positioning the same in communication with a preselected metering conduit, and fluid pressure positioning means for yieldably holding the valve in the position to which it is set by the engagement of said valve with said engaging means on the table, said pressure positioning means including means for directing pressure fluid alternately to said reaction surfaces when said valve is moved in one direction by said engaging means thereby first to exert a pressure fluid force on one of said reaction surfaces in opposition to the positioning action of said engaging means and second to exert a pressure fluid force on the other of said reaction surfaces in cooperation with the positioning action of said engaging means whereby a snap positioning action of said valve is obtained.

References Cited in the file of this patent

UNITED STATES PATENTS

| | | |
|---|---|---|
| 1,251,563 | O'Donnell | Jan. 1, 1918 |
| 1,938,762 | Haas | Dec. 12, 1933 |
| 2,063,414 | Tweddell | Dec. 8, 1936 |
| 2,148,348 | Groene | Feb. 21, 1939 |
| 2,505,710 | Hayden | Apr. 25, 1950 |